CARRIER TELEPHONE SYSTEMS

Filed Nov. 10, 1958 8 Sheets-Sheet 1

INVENTOR
LESTER Q. KRASIN
BY R. O. Covell
ATTORNEY

Dec. 31, 1963 L. Q. KRASIN 3,116,371

CARRIER TELEPHONE SYSTEMS

Filed Nov. 10, 1958 8 Sheets-Sheet 2

INVENTOR
LESTER Q. KRASIN
BY
R. D. Covell
ATTORNEY

Dec. 31, 1963 L. Q. KRASIN 3,116,371

CARRIER TELEPHONE SYSTEMS

Filed Nov. 10, 1958 8 Sheets-Sheet 3

INVENTOR
LESTER Q. KRASIN
BY
R. O. Covell
ATTORNEY

INVENTOR
LESTER Q. KRASIN
BY
R. O. Covell
ATTORNEY

Dec. 31, 1963 L. Q. KRASIN 3,116,371

CARRIER TELEPHONE SYSTEMS

Filed Nov. 10, 1958 8 Sheets-Sheet 5

INVENTOR
LESTER Q. KRASIN
BY
R. D. Covell
ATTORNEY

INVENTOR
LESTER Q. KRASIN
BY
R. O. Covell
ATTORNEY

INVENTOR
LESTER Q. KRASIN
BY
R. O. Covell
ATTORNEY

INVENTOR
LESTER Q. KRASIN
BY
R. D. Covell
ATTORNEY

United States Patent Office 3,116,371

Patented Dec. 31, 1963

3,116,371

CARRIER TELEPHONE SYSTEMS

Lester Q. Krasin, Amarillo, Tex., assignor, by mesne assignments, to Lenkurt Electric Co., Inc., San Carlos, Calif., a corporation of Delaware Filed Nov. 10, 1958, Ser. No. 773,024
13 Claims. (Cl. 179—15)

This invention relates to communication systems and particularly to carrier telephone systems.

Objects of the invention are the provision of additional trunk facilities in multi-office telephone systems, more efficient utilization of cable facilities, and the provision of carrier frequency channels over the conductors of interoffice cables.

Further objects are a carrier system which provides message circuit trunk service between the various local exchanges of a multi-exchange telephone system, minimization of the cost of such a system, and the expansion of the trunk facilities without providing additional inter-exchange cable.

Further objects of the invention are the provision of a carrier system comprising interoffice telephone trunks capable of substantially uniform performance under all conditions of traffic loading, and one which will operate satisfactorily over any combination of cables of different type and gauge.

A further object is the provision of a carrier telephone system involving the use of pulse position modulation converted to sine wave phase modulation by the use of passive elements and transistors.

Further objects are the provision of a carrier telephone system comprising carrier channel trunks, over interoffice cable, designed to minimize cross-talk interference, both co-channel and adjacent channel interference, and one in which cross-talk remains substantially constant under all conditions of traffic loading.

A further object is the provision of carrier operated trunks over interoffice telephone cable, adapted to connect with trunk and signal circuits of conventional types, for instance, loop dialing, reverse battery supervision.

This invention is a carrier telephone system comprising a plurality of carrier channels connected to a pair of cable conductors, each channel having a different carrier frequency, the modulation being pulse position modulation converted to sine wave phase modulation for transmission over the cable conductors. A feature of such a system is the application and removal of a particular voice frequency, for instance 4000 cycles per second, for transmitting supervisory and dialing signals. Another feature is the use of transistors wherever possible in such a system to obtain low cost and reliable operation. A further feature is the use of the same frequencies of transmission in both directions through the same cable. A further feature of the system is the use of the same particular voice frequency for signaling in both directions over all of the carrier channels, the signal frequency being applied in each direction to further modulate the carrier. Filter means in the carrier transmitter prevents the application of voice current of signal frequency from being applied to the modulator; and filter means in the carrier receiver blocks transmission of signal frequency current to the voice path of the associated trunk circuit but passes the signal current to the signal receiving means of this trunk circuit. In the channel idle condition, signal current is transmitted in both directions over each carrier channel; and supervisory and dial pulse signals are transmitted by disconnecting or reconnecting the signal frequency supply to the carrier transmitter.

Another feature of the invention is a carrier system in which the carrier transmitter employs pulse width modulation, conversion to pulse position modulation and then to phase, or frequency, modulation and the use of transistor elements to effect the various operations. A further feature is the use of passive elements in a carrier transmitter to multiply the carrier frequency and the modulation.

A further feature is a carrier telephone system as above described in which one cable pair is common to a plurality of carrier channels for transmission of voice modulated carrier currents in one direction and another cable pair is common to the same channels for transmission of voice modulated carrier currents in the other direction.

Another feature of the system is the provision of repeaters to compensate for attenuation in a carrier cable, there being one repeater in each of the two pairs at each repeater location for amplifying the carrier currents of all of the channels to which the two cable pairs are common. Further features are the use of transistor amplifiers, one for each conductor, in push-pull relation, and the provision of a regulated current power supply connected in simplex to each pair of conductors to feed all of the repeaters inserted in each cable pair, no local power supply being required at the one or more repeater locations. A related feature is the use of transistor elements for input current regulation and for rectification of a voice frequency supply voltage for addition to a battery voltage to provide a voltage sufficient for feeding all of the repeaters inserted in a carrier channel cable pair between remote exchanges.

Another feature of the invention is a carrier channel receiver for response to phase or frequency modulated carrier current, this receiver comprising amplifying, limiting, demodulating and integrating means for conversion of incoming voice modulated carrier current to voice currents. A further feature is the use of transistor amplifying, limiting and demodulating elements in the carrier receiver. A further feature is the use of a transistor amplifier which operates in a Class C manner and responds to only the negative tips of the applied carrier frequency input current.

Another feature of the carrier receiver is the elimination of amplitude modulation, which may be present in the carrier current input due to noise or any other cause, by including in the output circuit of the limiter amplifier a small capacitor which passes high frequencies but not voice frequencies and by negative feedback of any amplitude modulation which is present in the output to amplitude modulate the carrier in the opposite phase. Another feature is further limiting action, responsive to an increase in the input level, by effecting a decrease in the collector supply voltage of the transistor to which the input carrier is applied; whereby the gain in the transistor is reduced and the output level tends to remain constant as long as the input level is high enough to operate the limiter.

A further feature of the carrier receiver is the use of a network to apply the constant level input to the transistor demodulator, the network producing out-of-phase input voltages for application through oppositely poled diodes to the base of the transistor, whereby the conduction of the transistor is controlled to pass square waves whose energy content is linearly related to the phase deviation of the incoming carrier current. A further feature is the use of integrating means which converts the square waves into voice currents.

A clear and complete understanding of the invention will be facilitated by describing a system embodying the invention and its features, above and hereinafter mentioned, one such system being represented schematically in the drawings which form a part of this specification.

Referring to the drawings, which consist of FIGS. 1 to 12, inclusive:

FIG. 1 shows, in block diagram form, the various functional units of a carrier telephone system comprising carrier trunks over an interoffice cable;

FIGS. 2*a* and 2*b* show a channel oscillator;

FIGS. 3*a* and 3*b* show a 4 kc. signal tone generator;

FIGS. 4*a* and 4*b* show a carrier channel transmitter;

FIGS. 5*a* and 5*b* show a carrier channel receiver;

FIGS. 6 and 6*a* to 6*e* and FIGS. 7 and 7*a* to 7*e* show the limiter and demodulator circuit portions of the receiver with explanatory wave forms;

FIG.8 shows a group translator;

FIGS. 9*a* and 9*b* show a repeater; and FIG. 9*c* illustrates the spacing of repeaters along an interoffice cable pair;

FIGS. 10*a* and 10*b* show a repeater power supply unit;

FIG. 11 shows the signaling unit at each end of a trunk arranged for loop dialing and reverse battery supervision; and FIG. 12 shows the signaling unit at each end of a foreign exchange trunk.

*General Description*

The carrier telephone system represented in FIG. 1 is designed to provide a reliable and economical cable carrier system for use in inter-exchange and toll service. It provides twenty toll-quality channels operated on a four-wire carrier current basis over each two pairs of an interoffice or toll cable. It may be used with trunk circuits arranged for E and M signaling, all types of dialing and supervision, revertive pulsing and with trunks arranged for transmission of voice signals on either a two wire or a four wire basis. Each carrier channel unit comprises a carrier transmitter and a carrier receiver, both associated with a trunk circuit which is to be operated on a carrier basis. The output of the transmitters is connected to one pair of an interoffice cable; and the input to the carrier receivers is received over another pair of the cable. This system is designed to operate over existing local exchange cable facilities and may include repeaters at approximately 20 db spacing to amplify the carrier frequency currents to compensate for the attenuation loss in the cable. Adjustable slope equalization is included in each repeater and the amplification therein is individually adjustable. Only one repeater is required, at each repeater location, for the twenty channels carried by each cable pair.

This system is represented in FIG. 1 by two carrier channel units 1A and 1B, two associated trunk circuit units, one for each channel unit, a master oscillator unit, a group translator, and a power and carrier feed unit. The carrier channel 1A is one of ten channels in an A group and carrier channel 1B is one of ten channels in a B group which are connected to the same two cable pairs. The channel carrier frequencies and frequency spacing provides the maximum number of toll-quality channels at the lowest possible cost. The channel frequencies allotted to the ten channels of each of the A and the B groups are from 192 kc. to 336 kc. there being a 16 kc. separation between the channel frequencies of the ten channels in each group.

Each of the two trunk circuit signal units, shown in FIG. 1 as being associated with channels 1A and 1B, consists of a transmit signal keying circuit controlling the application of 4 kc. signal tones to the channel modulator, a receive signal circuit, connected to receive the voice frequency signal current output from the channel receiver, and a hybrid coil unit which separately connects the talking conductors of the trunk to the associated channel transmitter and channel receiver, and consists of an attentuation pad connected between the hybrid coil unit and the output of the carrier receiver.

The master oscillator unit, shown in FIG. 1, consists of a 4 kc. signal tone generator 10 and ten channel oscillators, one for each of ten different control voltage frequencies, only the oscillator 11 for channel units 1A and 1B being shown. Each oscillator supplies control voltage of the same frequency to one channel in the A group and to one channel in the B group of each twenty channels connected to the cable. Distribution amplifiers (not shown) are provided to amplify the output of the channel oscillators and signal tone generator in case there is more than one bay of carrier channel equipment. Each of the oscillators, the signal tone generator and each of the distribution amplifiers, if provided, is individually mounted. The ten control voltage frequencies range from 48 kc. to 84 kc. with a 4 kc. separation. These control frequencies are multiplied in the channel transmitters to the channel output frequencies of from 192 kc. to 336 kc., each of which is four times that of the control frequency. The carrier output of the ten A group channels is applied to the associated cable pair without further change in frequency, but the carrier output of the ten B group channels is applied to a group translator which translates the frequencies in the 192 kc. to 336 kc. range to output frequencies of 16 kc. to 160 kc. for transmission over the cable pair. Carrier currents incoming over the other of the associated two cable pairs are passed through an amplifier directly to the group A channel receivers; but incoming carrier currents in the 16 kc. to 160 kc. range are applied to the group translator and converted to carrier frequencies of from 192 kc. to 336 kc. and then applied to the group B channel receivers.

The carrier transmitter of each of the channels consists of a limiter 205 or 305, a modulator 206 or 306, an amplifier 207 or 307 and a channel band-pass filter. The limiter consists of a transistor amplifier which amplifies low level voice frequency currents received from the hybrid coil unit 202 or 302 of the associated trunk circuit and also prevents high level voice frequency currents from overloading the modulator 206 or 306. The modulator, which consists of a transistor and associated circuit elements, superimposes the voice currents passed by the limiter 205 or 305 on the carrier current pulses received from the channel oscillator to effect a phase modulation. The carrier current is further modulated by the outgoing signal tone under the control of the keying circuit 201 or 301 of the associated trunk circuit. The carrier amplifier raises the amplitude of the modulated carrier current for application to the cable pair; and the channel band-pass filter, which couples the amplifier output to the cable pair, prevents interaction between the carrier current and other frequencies which may be present. This filter is tuned to pass the fourth harmonic of the carrier control voltage frequency for transmission over the cable.

Each carrier channel receiver consists of a channel band-pass filter 201 or 310, an amplifier limiter 211 or 311, a channel demodulator 212 or 312, a voice frequency amplifier 213 or 313, a signalling filter 214 or 314 and a signal amplifier 215 or 315. The channel band pass filter of an A group channel is tuned to pass carrier currents of the channel frequency incoming over the cable pair; and the channel band-pass filter 310 of a B group channel is tuned to pass carrier currents of the channel frequency incoming from the group translator. The amplifier limiter 211 or 311 amplifies these carrier currents and also limits amplitude variations in these currents so that the variations are not passed to the demodulator. The channel demodulator 212 or 312 consists of inductors, capacitors, transistors, resistors and other circuit elements connected to operate as a demodulator and convert the phase modulated carrier currents passed by the filter and limiter into voice frequency currents. The voice frequency output of the demodulator is amplified by the voice frequency amplifier 213 or 313 to a level suitable for application to the hybrid coil 202 or 302 of the associated trunk circuit. The output of this amplifier is applied to the receive signaling filter 214 or 315 which removes the 4 kc. signal tone and passes the other amplified voice currents to the attenuation pad 203 or 303 connected in the input path to the hybrid coil of the associated trunk circuit. The signal tone current is amplified by the signal amplifier for application to the receive signal unit 204 or 304 of the associated trunk circuit.

The power and carrier feed unit associated with the two cable pairs with which the ten A group and ten B group channels are associated combines the carrier curplies all of these output currents through a coupling translated carrier currents from the B group channels and applies all of these output currents through a coupling transformer P1 to the upper one of these cable pairs. The other coupling transformer P2 of this feed unit applies the carrier currents incoming over the lower cable pair to an amplifier 221. The amplified incoming currents of the A group frequencies pass directly to and through the channel band-pass filters of the receivers in the A group; but the amplified incoming currents of the lower frequency range are converted in the group translator to the higher frequency range before application to the channel band pass filters 310 of the receivers in the B group. The power and carrier feed unit further includes a regulated repeater power supply unit 220 which is connected to the mid-point of the outgoing winding of the coupling transformer P2 associated with the lower cable pair. The supply circuit extends over the conductors of this pair in parallel to ground potential at the mid-point of the corresponding transformer winding at the other end of the cable pair, such a ground connection being shown for the mid-point of the outgoing side of the coupling transformer P1 connected to the upper cable pair with which this feed unit is associated.

The group translator comprises a 352 kc. oscillator 325, a group modulator 320 and a group demodulator 328. In the group modulator, the outgoing carrier currents from the ten B group channels modulate the 352 kc. supply. The modulated output currents, which include upper side bands generated in the modulation process, are applied to a low-pass filter 321 which passes the frequency band of 16 kc. to 160 kc. The output of this filter is amplified and combined with the A group output carrier currents of 192 kc. to 336 kc. to the outgoing coupling transformer P1 in the power and carrier feed unit. The carrier currents incoming over the lower cable pair in the frequency band of 16 kc. to 160 kc. are applied, after amplification, to a low-pass filter 326 and amplifier 327 in the group translator to the group demodulator 328 which translates these carrier currents to the 192 kc. to 336 kc. range. The output of the demodulator is amplified and then applied to the channel band-pass filters of the B group of channel receivers.

*Detailed Description*

Figure 2B:
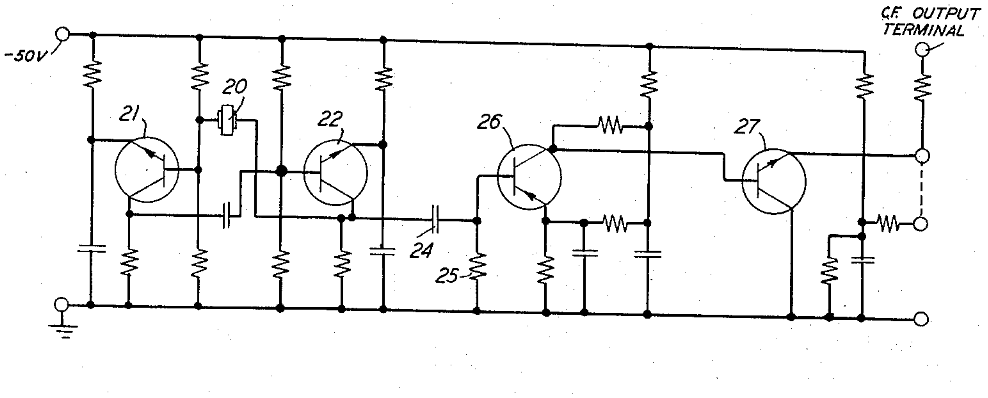
Figure 2A:
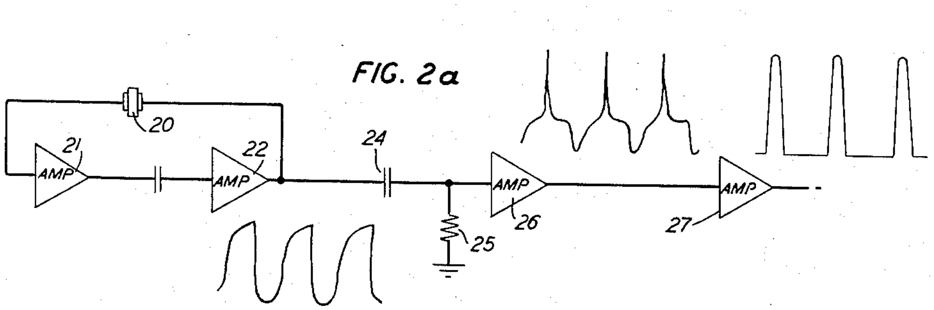

The channel oscillator, shown in block diagram form in FIG. 2*a* and in circuit form in FIG. 2*b*, consists of a crystal controlled oscillator, pulse forming network and a power amplifier. The crystal oscillator consists of two transistor amplifiers 21 and 22 connected in tandem, with a crystal 20 connected between the output of the second transistor amplifier and the input of the first transistor amplifier. Since a crystal presents a low impedance at the frequency at which it is series tuned and a high impedance at all other frequencies, only energy at the series tuned frequency of the crystal is fed from the output of the second transistor amplifier to the input of the first transistor amplifier. This results in the two amplifiers oscillating in a multivibrator type of operation at the series mode frequency of the crystal. The positive feedback of energy is of sufficient level to over drive the amplifiers resulting in a square wave output. This square wave is coupled to the power amplifier through a pulse forming network, which consists of a small coupling capacitor 24 connected to a resistor 25. This capacitor couples only the leading and trailing edges of the square wave to the power amplifier. These leading and trailing edges form positive and negative going pulses of short duration. The power amplifier consists of a PNP transistor 26 direct coupled to a NPN output transistor 27. Both transistors are normally biased past cut-off. Negative going pulses fed into the base of the PNP transistor turns on that transistor, which turns on the NPN output transistor to furnish a positive going pulse. Positive going pulses fed into the base of the PNP transistor turn that transistor further off so that these pulses do not appear in the output of the power amplifying transistor 27.

Figure 3B:
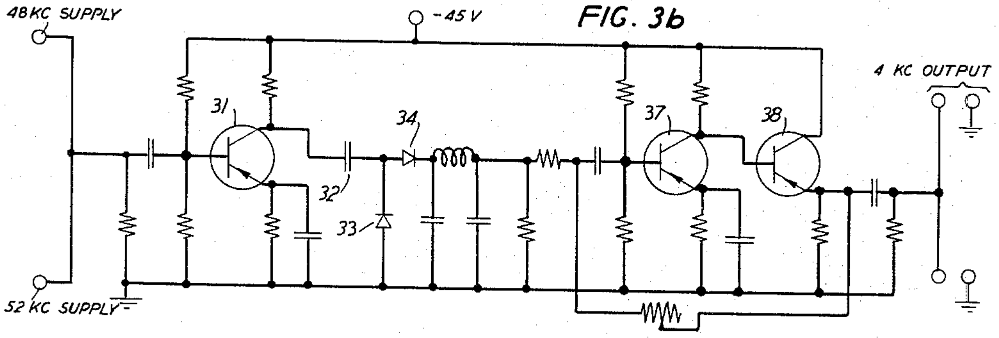
Figure 3A:
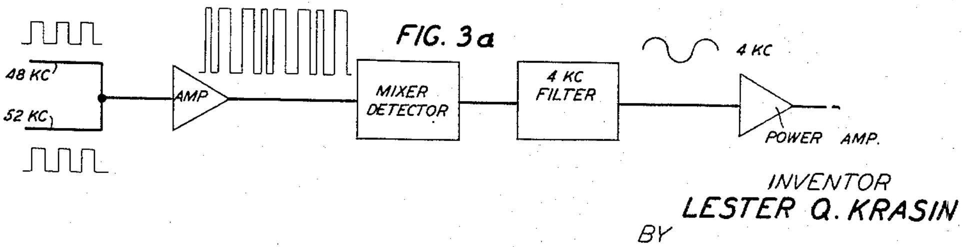

The signal tone generator, shown in block diagram form in FIG. 3*a* and in circuit form in FIG. 3*b*, consists of an amplifier, a mixer detector, a 4 kc. filter and a power amplifier. Square wave voltage from the 48 kc. channel oscillator and square wave voltage from the 52 kc. channel oscillator are mixed together in the base of a transistor 31. Output from the collector of this transistor is coupled through capacitor 32 to a demodulator network consisting of two diodes 33 and 34 and a low-pass filter. This demodulator detects the 4 kc. difference frequency between the two input signals, so that a 4000-cycle sine wave appears at the output of the low-pass filter. This 4 kc. signal output is fed to a two-stage direct coupled power amplifier comprising transistors 37 and 38. The output level of the power amplifier is adjusted by adjusting the amount of negative feedback between the two transistor stages.

Figure 4B:
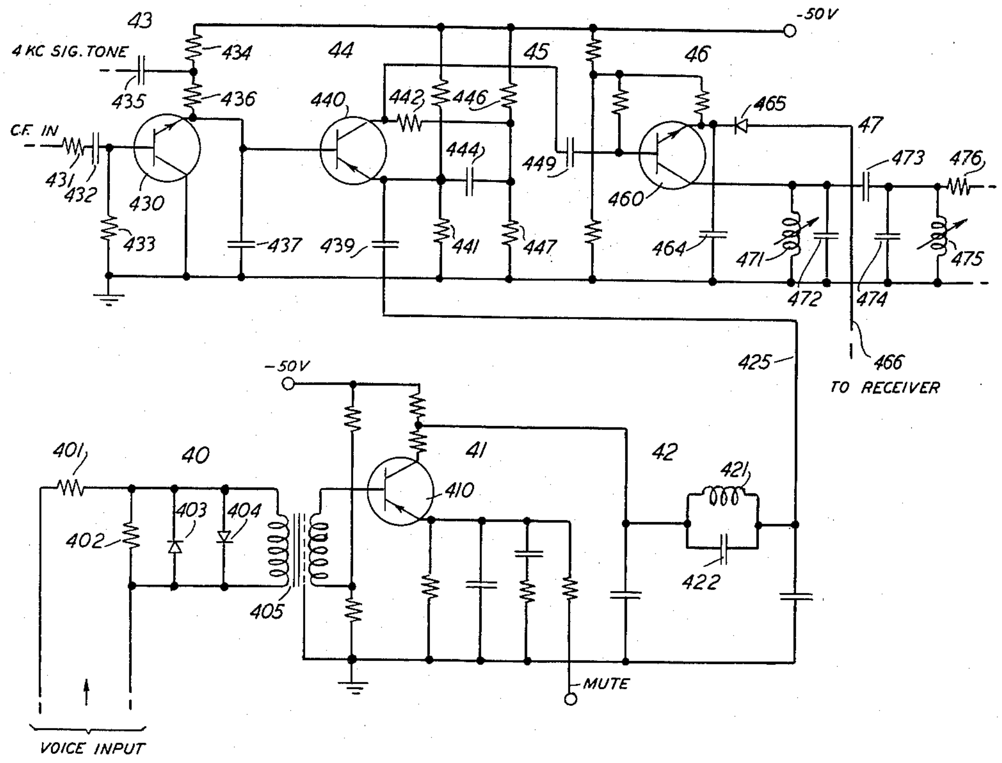
Figure 4A:
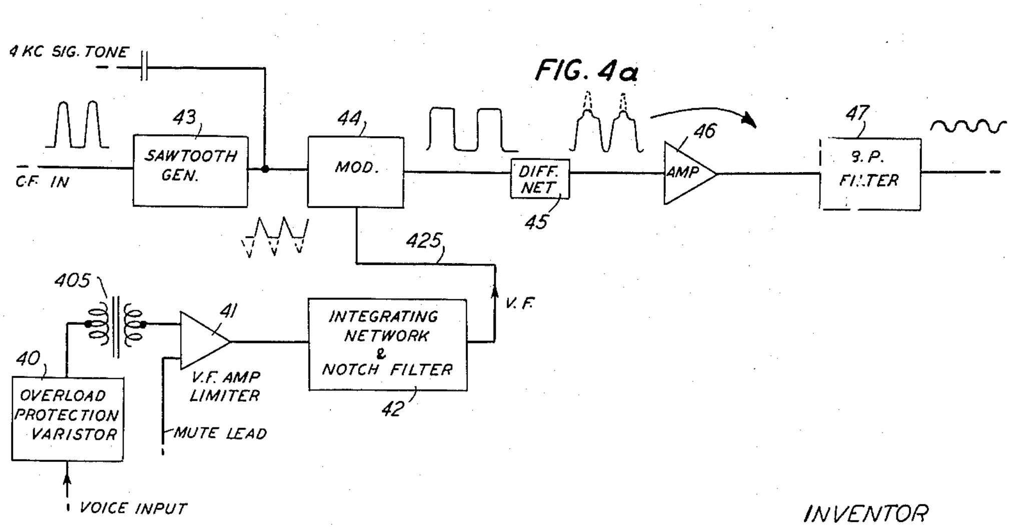

The carrier transmitter, shown in block form in FIG. 4*a* and in circuit form in FIG. 4*b*, consists of an impedance network and overload limiter unit 40, an input transformer 405, a voice frequency amplifier-limiter 41, an integrating network and notch filter 42, a saw-tooth generator 43, a modulator 44, a differentiating network or "peaker" 45, a carrier frequency power amplifier 46 and a carrier frequency band-pass filter 47. The voice frequency input from the hybrid coil of the associated trunk circuit is applied to the voice frequency amplifier-limiter through an impedance correcting network consisting of a resistor 401 in series and a resistor 402 in shunt. This impedance corrector is followed by a varistor type of overload limiter, consisting of varistors 403 and 404, which prevents dial pulses and similar type of signals from overloading the voice frequency amplifier 41. These varistors are inactive at levels encountered in normal types of conversation. The limiter is followed by a transformer which applies the voice frequency input to the voice frequency amplifier. The amplifier consists of a transistor 410 and its associated parts. Due to the network in the emitter leg of the transistor, the amplifier has the characteristic of increasing amplification with increasing frequency. In the collector circuit of this transistor, there is a network which attenuates the higher frequencies more than the lower frequencies; so that, at low levels of voice frequency, the overall amplification of the voice frequencies does not change essentially with frequency. At higher levels of voice frequency input, the amplifier acts as a limiter so that high levels of voice frequency will not effect over-modulation. As the voice frequency level is increased, the transistor amplifier stage will tend to overload and clip; so that, if a sine wave is fed to the amplifier, it appears as a square wave at the collector. This square wave is then modified by the network in the collector circuit so that it appears as a triangle at the modulator. Thus, the limiting consists of clipping and integrating the clipped output. This limiter is a "hard" limiter in that when the limiting level is reached, further increase in voice frequency input will not alter the peak level reaching the modulator. The network in the collector of this voice frequency amplifier-limiter also includes a 4 kc. signaling notch filter, consisting of inductor 421 and capacitor 422, to prevent false operation of the 4 kc. signal channel circuits due to 4 kc. current in the speech input.

The carrier frequency from the channel oscillator is supplied to the modulator by the discharge switching circuit of the sawtooth generator 43. The carrier frequency input wave is applied through resistor 431 and capacitor 432 to the base of transistor 430. The capacitor 437 is charged to a negative potential from −50 volt supply through resistors 434 and 436. The transistor 430, which is connected across capacitor 437 and biased to cutoff by a base leak biasing arrangement, is turned on by positive drive pulses of the carrier frequency, each pulse being of short duration. During the time that transistor 430 is in the turned-on condition, base current replenishes the turn-off bias charge across the drive pulse coupling capacitor 432. Also during the turn-on time, the transistor 430 acts as a low discharge path for the sawtooth capacitor 437. Thus the quick discharge and slow recharge of capacitor 437 constitutes a negative going sawtooth pulse at the repetition rate of the carrier oscillator. Also connected across the sawtooth capacitor 437 is the base of the modulator transistor 440. This transistor acts as a comparator; conducting when the voltage of the sawtooth wave applied to its base is equal to the fixed bias plus the voice frequency voltage that is applied through capacitor 439 across the emitter resistor 441. When the conduction point is reached on the base of transistor 430, the voltage across the sawtooth capacitor 437 is held from going more negative by the clamping action effected by the current which flows into the base of transistor 440 instead of charging capacitor 437. Thus conduction of the transistor 440 produces a square wave of voltage across its collector resistors 442 and 446.

The voice frequency voltage applied to the emitter through capacitor 439 changes the voltage at which the negative going sawtooth wave at the base of the modulator transistor effects conduction, thereby causing the leading edge of the square wave voltage produced at the collector to move back and forth at a voice frequency rate. This constitutes pulse width modulation. This square wave is coupled through a small value capacitor 449 to the base of the carrier frequency power amplifier transistor 460 to effect a differentiating action which passes the leading and trailing edges of the square wave as positive and negative going spikes. The positive going spikes, which turn on the amplifier transistor 460, have pulse position modulation since they are generated from the leading edge of the square wave, which leading edge is being varied by voice frequencies applied through capacitor 439 to the emitter of modulator transistor 440. The negative going spikes applied to the power amplifier are in the cut-off direction and therefore are eliminated from the output of the power amplifier. Since the base of the power amplifier 460 draws current during occurrence of the positive going pulses, the amplitude of these pulses is definitely limited as shown by the wave form in FIG. 4*a* so that a substantially square wave output is produced. In the collector circuit of the power amplifier transistor 460, there is a band-pass filter 47, whose center frequency is four times the oscillator drive pulse frequency. This filter, comprising inductors 471 and 475 and capacitors 472, 473 and 474 is being fed pulses at a repetition rate equal to one-fourth of its center frequency, causing oscillation at its center frequency; so that the output frequency of the filter is four times that of the input pulse frequency. The filter not only multiplies the frequency by four but also multiplies the phase modulation, introduced by the modulator, by four.

It is to be noted that 4 kc. signal tone is being applied through capacitor 435 and resistor 436 to capacitor 437. This causes the rate of charge of capacitor 437 to vary at a 4 kc. frequency, advancing or retarding the point of conduction of the modulator at a 4 kc. rate. Thus the signal tone also effects a phase modulation of the carrier frequency.

It is also to be noted that a "mute" lead is connected to the emitter of the voice frequency amplifier transistor 410 to effect application of −50 volts thereto whenever cut-off of the voice amplifying frequency transistor is desired, for instance, during the transmission of a dial pulse train under control of the signal keying circuit in the associated trunk circuit unit. The large value of capacitance in the emitter circuit is not completely discharged between dial pulses, thus keeping the voice frequency amplifier turned off until all of the pulses in a train have been transmitted. This slow release type of "mute" action prevents dialing from interfering with the transmission of signal tone to the carrier terminal at the far end of the associated cable pair.

Figure 1:
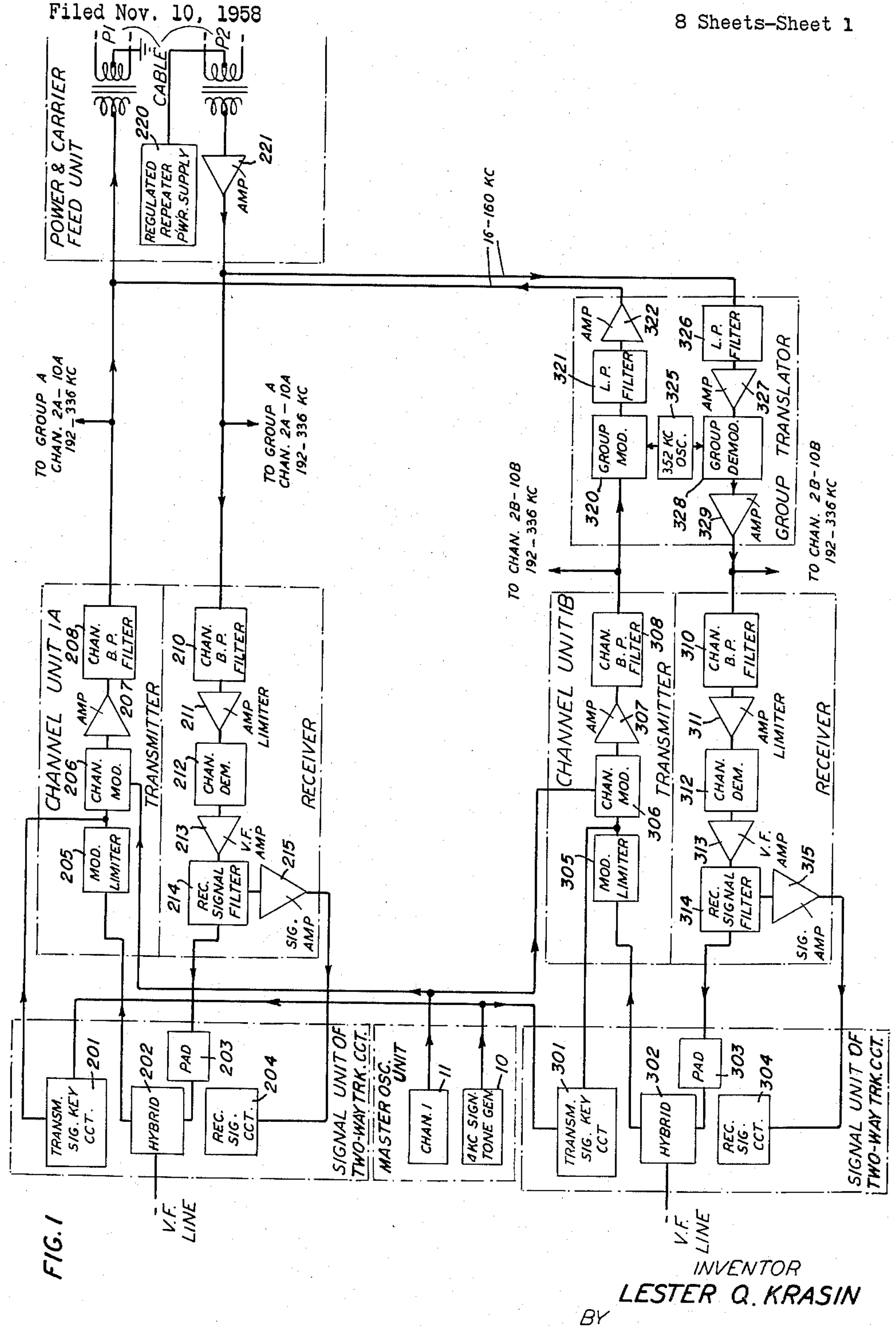
Figure 5B:
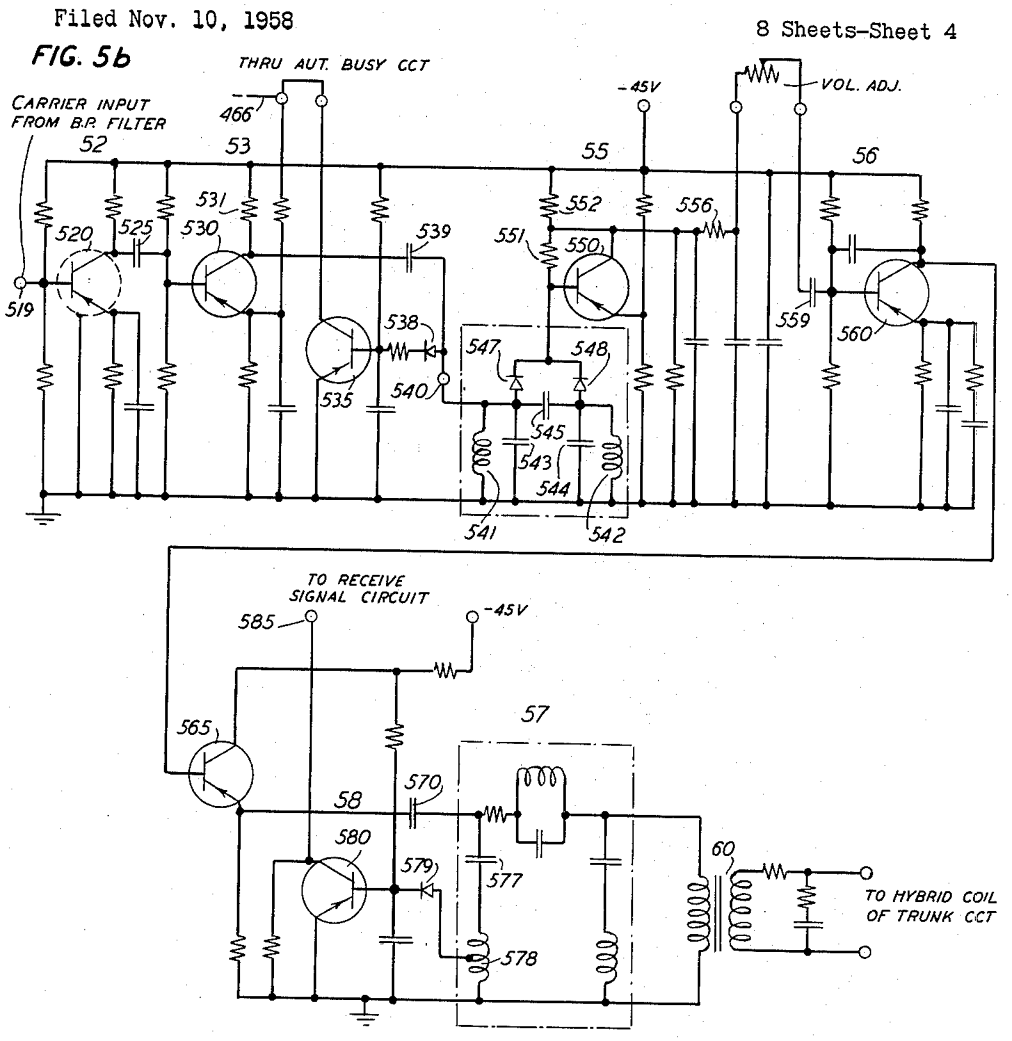
Figure 5A:
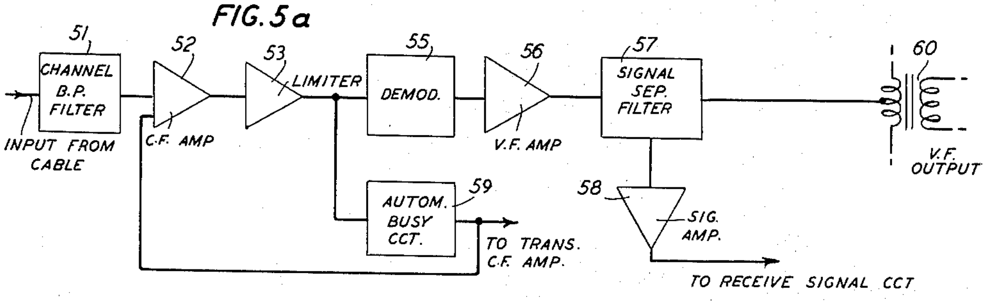
Figures 6, 6A, 6E:
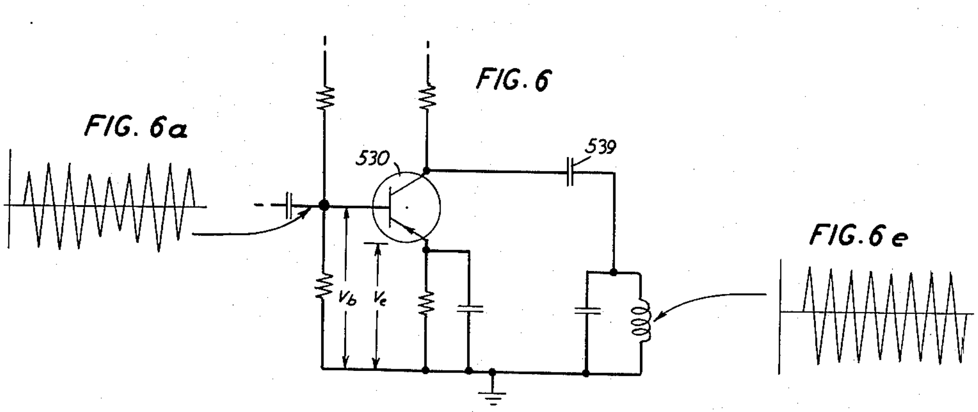
Figure 6B:
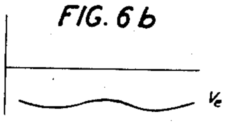
Figure 6C:
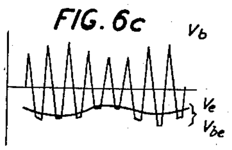
Figure 6D:
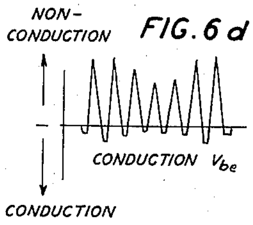
Figure 7A:
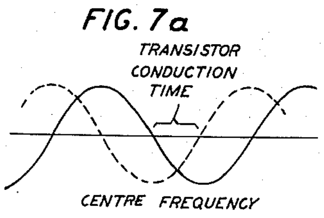
Figure 7B:
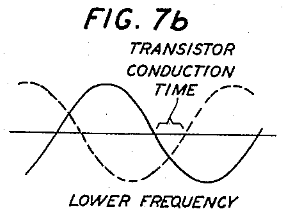
Figure 7C:
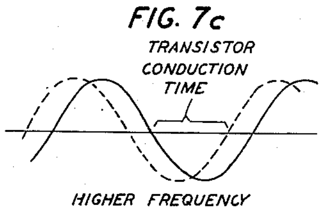
Figures 7, 7D, 7E:
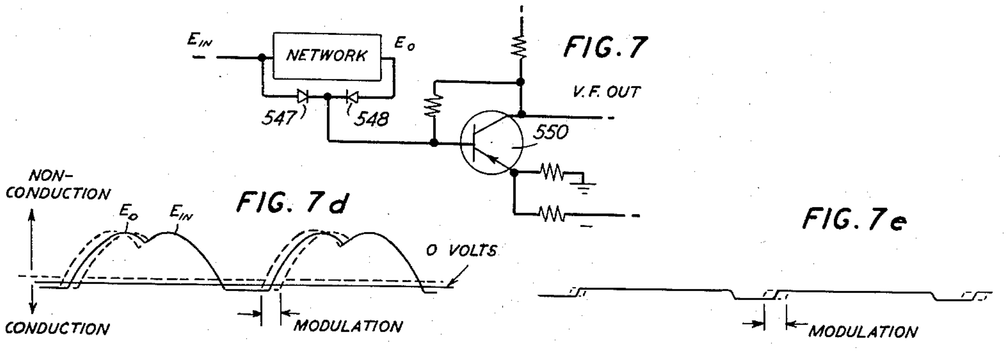

The carrier receiver, shown in block diagram form in FIGS. 1 and 5*a* and in circuit form in FIGS. 5*b*, comprises a channel band-pass filter 51, a carrier frequency amplifier 52, a limiter 53, a demodulator 55, a voice frequency amplifier 56, a signal separating filter 57, a voice frequency output transformer 60, a signal amplifier 58, and an automatic busy circuit 59. The channel band-pass filter 51 is connected between the incoming carrier pair of cable conductors and the carrier frequency amplifier. This filter, which is tuned to pass only the carrier frequency currents of the assigned channel frequency, may be of conventional design and is not included in the detailed circuits shown in FIG. 5*b*. The incoming carrier currents, passed by the filter are applied through the input terminal 519 of carrier frequency amplifier 52. This amplifier comprises transistor 520, the carrier input being amplified therein to the proper level for application to the base of transistor 530 of limiter 53. The limiter, which comprises transistors 530 and 535 and the associated resistors and capacitors, further amplifies the carrier input and also reduces any amplitude modulation, which may be present due to noise or channel filter response or to any other cause, thereby to help prevent response of the receiver circuit to noise. The limiting action of limiter 53 is effected by detecting the amplitude modulation which is present on the carrier and using this voltage to amplitude modulate the carrier in the opposite phase; so that the resultant amplitude modulation, on the carrier that passes through the limiter, is greatly reduced. The limiting action includes both dynamic and static limiting. The amplitude of the carrier frequency input to the limiter is large enough so that the transistor 530 functions in a class C manner and only the negative tips of the carrier frequency input cause conduction in the transistor. Since the base and emitter act as a diode, the envelope of the carrier frequency current appears across the collector bypass capacitor 539, this capacitor being too small to act as a bypass at voice frequencies. The voltage $V_e$ on the emitter effectively subtracts from the voltage $V_b$ on the base (as shown in FIG. 6); so that the voltage $V_{be}$ between the base and emitter which causes conduction consists only of the tips of the carrier frequency input currents. The conduction pips of current tend to be constant area. These constant area pulses are then integrated in a tuned circuit comprising inductor 541 and capacitor 543 to provide constant output amplitude. The static limiting is effected by a decrease in the collector supply voltage with increase in the level of carrier frequency input. As the input level increases, the resulting increase in the conduction area amounts to an increase in current through the collector voltage supply resistor 531; whereby the drop in voltage across this resistor reduces the supply voltage to the collector thereby to decrease the gain effected in transistor 530. Thus the output level tends to remain constant as long as the carrier input level is high enough to operate the limiter circuit. FIG. 6 shows part of the limiter and together with FIGS. 6*a* to 6*e* illustrates the input and output wave forms and the emitter and base voltages which control the area of conduction through transistor 530.

The carrier frequency output of the limiter 53 is applied to the input terminal 540 of demodulator 55. This demodulator comprises an input network, a diode switching circuit, a transistor 550, and an integrating network. The input network, consisting of inductors 541 and 542 and capacitors 543, 544 and 545, constitutes means for sensing the instantaneous input frequency and for providing a phase shift between the input voltage E*in* applied to diode 547 and the voltage E*o* applied to diode 548. The diodes 547 and 548 connect the network voltages to the base of transistor 550, each diode being in a conductive or closed condition when the voltage applied thereto from the network is positive and in an open condition when the voltage applied thereto from the network is negative. When the voltage E*in* is more positive than the voltage E*o*, the diode 547 is in closed condition and diode 548 is in open condition; when the voltage E*o* is more positive than the voltage E*in*, the diode 547 is in open condition and the diode 548 is in closed condition; and when both E*in* and E*o* are negative both diodes are in open condition. Thus the diodes and network act as a switching network for input to the transistor 550. When either diode is conducting, the base of the transistor is positive and holds the transistor non-conductive. When both E*in* and E*o* are negative, both diodes are open so that the network is disconnected from the transistor; and during this time there is current through resistor 551 and the base. The transistor is biased so that conduction is triggered on by the 0 voltage axis crossing of the network voltage E*in* going negative, and the conduction is triggered off by the 0 voltage axis crossing of the network voltage E*o* going positive. Only the region of plus or minus 0.1 volt from the zero voltage axis has any influence on the conduction of the transistor. Since amplitude modulation changes only the amplitude to which the voltage rises without influencing the time of axis crossings, the conduction time of the transistor does not respond to amplitude modulation. During the time of conduction, the current is controlled by the base resistor 551 and not by the network. Since the relative phase shift between E*in* and E*o* varies with frequency, the length of time the transistor is conductive also varies with frequency. Thus frequency variation has been changed into pulse width variation. This pulse width variation is integrated in the collector circuit of transistor 550, so that the voltage applied to capacitor 559 is a function of the frequency of the input to the sensing network. Thus frequency variations, caused by phase modulation in the corresponding carrier transmitter at the other end of the cable pair, are converted back to voice frequency currents. FIG. 7 and FIGS. 7*a* to 7*e* show the sensing network and transistor 550 and voltage wave forms representing the control of the conduction time of the transistor.

The demodulator voice frequency current output is applied through capacitor 559 to the base of transistor 560 of the voice frequency amplifier 56. This input includes 4 kc. signal tone. The output of transistor 560 is applied to the base of a second transistor 565 for further amplification. The amplified output of the second transistor is applied through capacitor 570 to the signal separating filter 57. This filter comprises an LC tuned network for eliminating the 4 kc. signal tone, so that only the voice currents pass through the output transformer 60 to the hybrid coil of the associated exchange trunk circuit. The 4 kc. signal tone, applied through capacitor 570, is blocked by the LC filter and transmitted through the tuned network consisting of capacitor 577 and inductor 578 and through diode 579 to the base of transistor 580 of the signal amplifier 58; and the amplified signal current in the collector circuit of transistor 580 is applied through terminal 585 to the receive signal means of the associated exchange trunk circuit.

Figure 8:
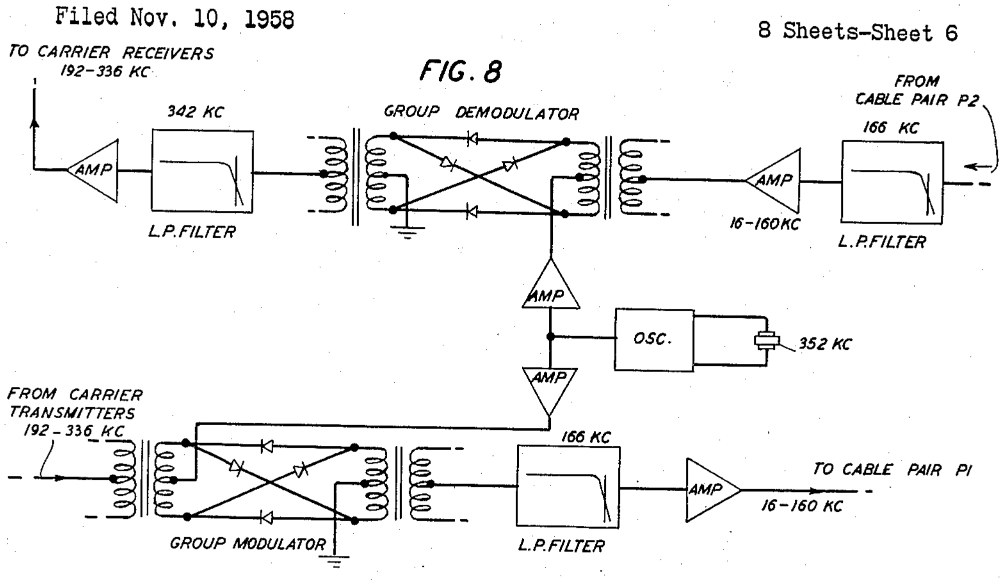

The translator unit, shown in FIGS. 1 and 8 comprises a group modulator, a group demodulator, and a 352 kc. crystal controlled oscillator, the output of which is fed through separate amplifiers to the modulator and demodulator. The translator further consists of input and output filters and amplifiers coupled to the modulator and to the demodulator. This unit translates the band of frequencies from 192 kc. to 336 kc. to the low band of frequencies of 16 kc. to 160 kc. for transmission to and reception from the associated pairs of inter-exchange cable. This allows the use of a basic group of channels in the higher frequency band to be used for the "B" group of channels. This higher band of frequencies permits the use of more economical channel filters and modulators. The translation is basically accomplished by passing the transmitted frequencies from the channel units through a group modulation process to translate them to a lower band of frequencies which are coupled out on the carrier line. Another group demodulator retranslates this band of frequencies back up to the high band for reception. The transmitted frequencies in the band from 192 kc. to 336 kc. are combined together in the group modulator with a carrier frequency of 352 kc. Two side bands are produced; the lower side band of 16 kc. is passed through a low-pass filter which has a cut-off frequency of 166 kc. This filter blocks the straight through feed as well as the upper side band generated in the group modulator. The low-band of frequencies, after passing through the low-pass filter is amplified to the proper level to be coupled onto the carrier line. The received band of frequencies of 16 kc. to 160 kc. is separated from the receive line by using a low-pass filter with a cut-off frequency of 166 kc. This band of frequencies is amplified and applied to a group demodulator. A carrier frequency of 352 kc. is used in the demodulation process which produces two side bands. The lower side band of 192 kc. to 366 kc. is selected by using a low-pass filter with a cut-off frequency of 342 kc. This band of frequencies is then amplified to the proper level to apply to the channel unit band-pass filters.

Figure 9B:
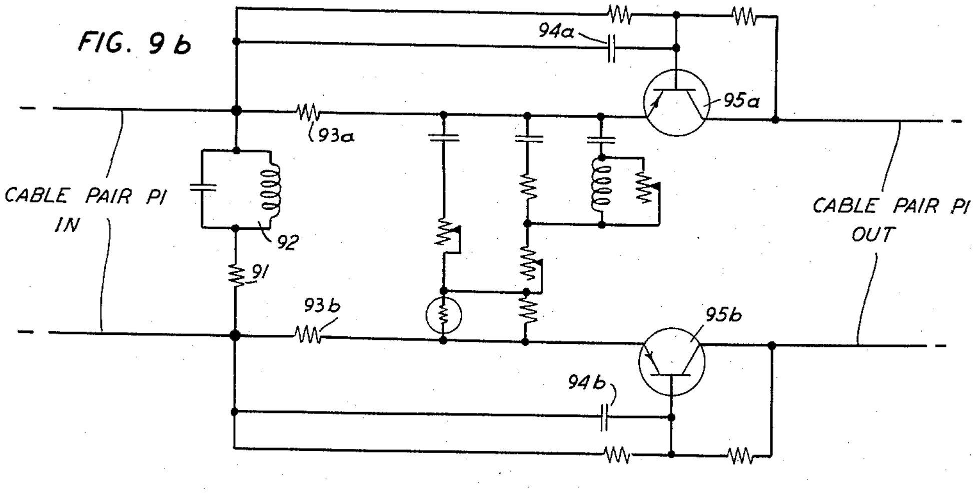
Figure 9C:
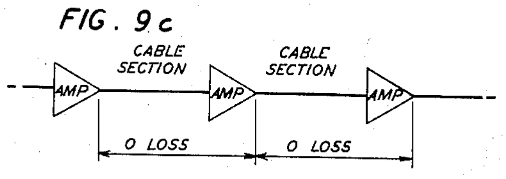
Figure 9A:
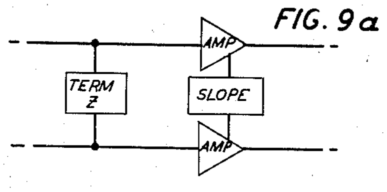

The repeater unit, shown in block diagram form in FIG. 9*a* and in circuit form in FIG. 9*b*, consists of a terminating input network and two transistor amplifiers. FIG. 9*c* illustrates the spacing of repeaters along the cable. This repeater arrangement provides a wide band, transistorized distributed amplification method to obtain a "0" loss circuit at carrier frequency. Amplifiers are inserted in series with the cable at intervals corresponding to about 20 db of attenuation at 336 kc. Thus the cable section itself acts as the coupling network between amplifiers and also a complex load impedance for the output of the amplifier. The amplifier is so arranged that the combination of a section of cable, acting as the input coupling network to the amplifier, along with the amplifier and another section of cable, acting as an output load for the amplifier, yield a "0" loss circuit. The same cable pair also serves as a conductor to feed power to the amplifiers. The input terminating network consists of a resistor 91 in series with a reactance cancelling network 92; so that this network in conjunction with the repeater furnishes a termination for the cable pair which is feeding signal to the input of the repeater. Two transistors 95*a* and 95*b* operate push-pull as common emitter amplifiers; and a complex emitter bypass network adjusts the gain of the amplifier by degeneration to match the attenuation slope that is encountered in the cable. Input signal is coupled to the base of the transistors by coupling capacitors 94*a* and 94*b*. The base lead is also connected to the midpoint of a resistor divider connected between input and output to furnish "turn on" bias to the transistor. In the emitter lead is a resistor 93*a* or 93*b* which is partially by-passed by the complex network connected between the emitters. This network is frequency dependent so that it has more impedance at low frequencies than at high frequencies. Since there is less degeneration at high frequencies, due to the lower impedance of this network, the gain of the repeater will be higher at high frequencies. Thus the gain of the repeater amplifier can be made to follow the attenuation of the cable by proper adjustment of the variable resistors of this bypass network. Power is supplied to the repeater amplifier by supplying constant current on a simplex basis to the cable, so that the two wires in the cable carry the power to the repeater as well as furnishing a transmission path for the carrier currents.

Figure 10B:
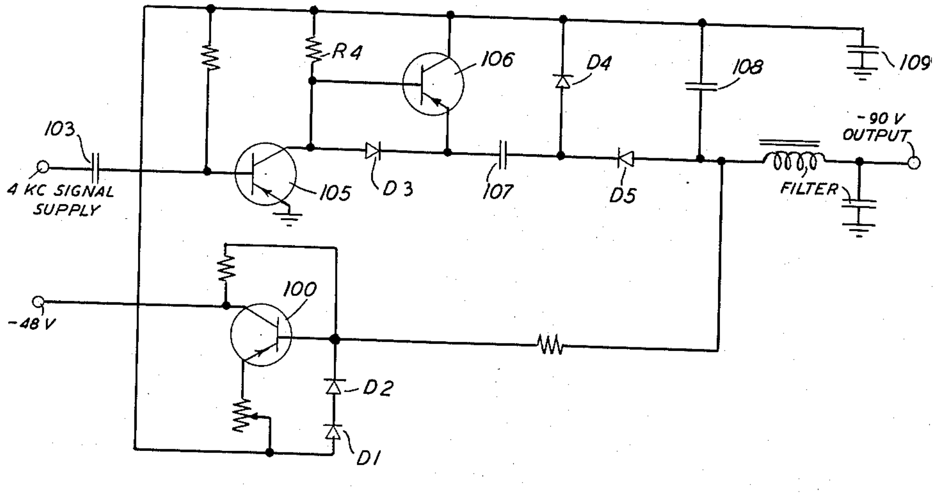
Figure 10A:
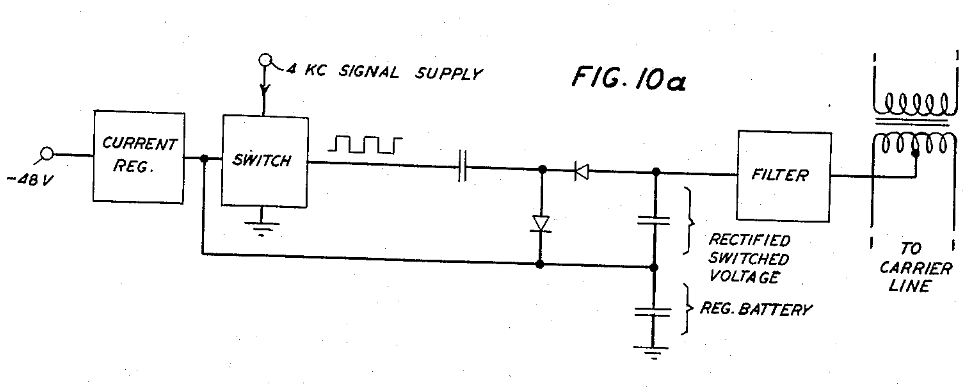

The current regulated repeater power supply, shown in FIGS. 1, 10*a* and 10*b*, consists of an input current regulator, a transistorized switching circuit, voltage doubler and ripple filter. Battery voltage is connected to the input current regulator which consists of a power transistor 100, reference diodes and associated resistors. In the base circuit of this transistor are two diodes D1 and D2 both of which are biased in the forward (low resistance) direction. Due to the non-linear resistance characteristic of these diodes, the voltage drop across these diodes remains essentially constant over a considerable range of current. This holds the voltage drop constant between the base and the lower end of the emitter resistor. By transistor action, the voltage drop across the emitter resistor is held to the voltage drop across the diodes, so that the current through the transistor is held constant. Since more than 45 volts maximum drop is needed to supply a long chain of repeaters, a means is provided to obtain an additional voltage source and add it in series with the current regulated battery supply. This is accomplished by rectifying the output of a transistorized switching circuit. Since the voltage supply to the transistor 105 is current regulated, the rectified output will be constant current. This switch is operated in the same manner as a single-pole double-throw switch being operated at a 4 kc. rate. The switch consists of two transistors 105 and 106, a disconnect diode D3 and associated resistors. The input transistor 105 has its emitter connected to ground, its base being driven from complete turned on condition to turned off condition by the 4 kc. signaling supply. This alternately switches the collector to ground through a low resistance (turned on condition) or opens this ground connection by changing the resistance of the transistor between collector and emitter to a very high value (turned off condition). When the input transistor 105 is in the turned-on condition, the coupling capacitor 107 feeding the rectifier diodes D4 and D5 is connected to ground through the low resistance path provided by the input transistor 105 and the disconnect diode D3, which is held in the low resistance condition by the direction of the current in the circuit. The voltage drop in the forward direction across the diode D3 is greater than the voltage drop across the input transistor. This condition places a voltage drop between base and emitter of the second transistor 106 in such a direction that it is in turned-off condition (high resistance between collector and emitter). When the input transistor 105 is in the turned-off condition (high resistance between collector and emitter), the voltage drops around the circuit cause the disconnect diode D3 to be biased in the reverse direction and to become essentially open. This allows the resistor R4, which is connected between the battery supply and base of the second transistor 106 to furnish turn-on current for transistor 106. Since the coupling capacitor 107 feeding the rectifier diodes is tied to the emitter of transistor 106, the turning on of this transistor connects the capacitor 107 to the battery supply through the low resistance between the emitter and collecor of transistor 106. Thus the 4 kc. input to the first transistor 105 effectively switches the coupling capacitor 107 between ground and battery at a 4 kc. repetition rate. The rectified voltage thus built up across capacitor 108 is added to the regulated battery voltage across capacitor 109 to provide the required higher output voltage. A ripple filter consisting of a small inductance and capacitor is connected in the output of the power supply to remove the 4 kc. ripple frequency appearing in the output.

Figure 11:
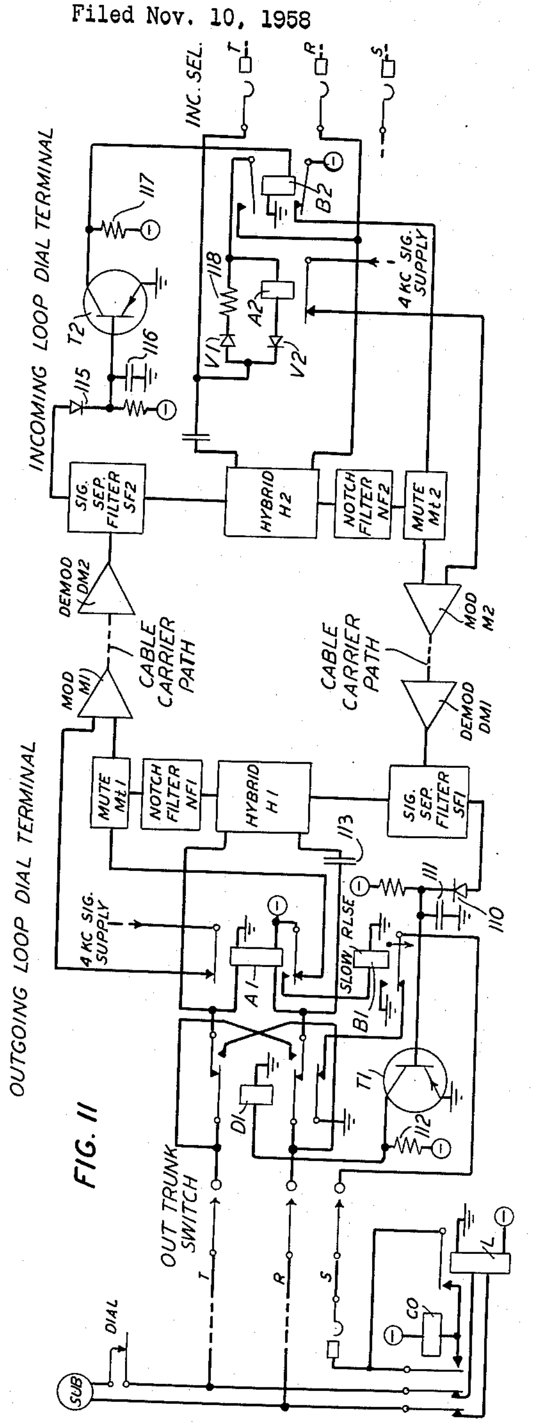

The inter-exchange trunk circuit, shown in FIG. 11 is arranged for loop dialing and reverse battery supervision and meets the trunk circuit requirements for carrier operation between a rotary out-trunk switch in one exchange and an incoming selector in a distant exchange. This trunk circuit is represented by its signaling elements at each end and is shown in the idle condition with the 4,000 cycle signal tone being transmitted in both directions. When a subscriber who is placing a call is connected to the tip and ring of the outgoing loop dial terminal, the subscriber's set closes the loop between tip and ring causing current to flow through the windings of relay A1. The operation of relay A1 removes the 4,000 cycle tone from the modulator, removes the 48-volt battery from the mute circuit M*t*1, which disables the mute and allows voice frequency currents from the hybrid unit to pass through the mute circuit to the modulator and energizes the winding of relay B1. Operation of relay B1 places a holding ground on the sleeve lead. In idle condition, the incoming loop dial terminal is receiving 4 kc. signal tone from the outgoing terminal. This tone is demodulated at the channel demodulator DM2 and fed to the signal separation filter SF2. This filter separates the other voice frequency currents from the 4 kc. signal tone, feeding the voice frequency currents to the hybrid unit H2 and the signal tone to the varistor 115. The varistor detects the tone, charging capacitor 116 with a polarity of voltage that turns off transistor T2, allowing all the current passing through resistor 117 to flow through the winding of relay B2 to effect the operation of this relay. When no 4,000 cycle tone is received by the incoming terminal, capacitor 116 is allowed to charge to a negative potential, turning on transistor T2 to be a low resistance shunt across the winding of relay B2 and thus cause the current flowing through resistor 117 to flow through the transistor instead of through the winding of relay B2. Thus when a subscriber's set, in "off-hook" condition, is connected to the tip and ring of the outgoing loop dial terminal, relay A1 operates, removing the tone from modulator M1 which allows transistor T2 to conduct thus releasing relay B2 and thereby connecting a network consisting of resistor 118, oppositely poled varistors V1 and V2, and the winding of relay A2 across the tip and ring of the incoming loop dial terminal. The battery voltage appearing across the tip and ring from the office equipment is of such polarity that varistor V1 is biased in the forward, or low resistance direction, to conductively connect the resistor 118 across the tip and ring. Varistor V1 is biased in the high resistance direction so that no current flows through the A2 relay winding. When the B2 relay operates, the 48-volt battery is removed from the mute circuit M*t*2, releasing the muting effect so that voice frequency currents may be transmitted back toward the outgoing loop dial terminal. The resistor 118, while closing the loop to the incoming selector, also furnishes a partial termination to the hybrid circuit, so that, although a two-way talking path has been established before the switching equipment in the office has furnished a proper termination at the incoming loop terminal, the circuit will not become "hollow." When the calling subscriber dials, opening and closing the loop to the outgoing loop dial terminal, relay A1 alternately releases and reoperates responsive to each dial pulse. Corresponding pulses of 4,000 cycle tone are transmitted to the incoming loop dial terminal; and pulses of 48 volts are transmitted to the mute circuit M*t*1, which, being a slow-release circuit, holds the transmitted voice frequency path muted during the transmission of the dial pulse train so that the modulation path is clear for transmission of pulsed signal tone. Since the B1 relay is a slow-release relay, it remains operated during the dial train, maintaining a ground on the sleeve lead. When the incoming loop dial terminal receives the pulsed signal tone, relay B2 follows the pulses, whereby corresponding loop pulses are transmitted through resistor 118 to extend the connection to the called subscriber. Battery is also pulsed to the slow-release circuit which blocks the voice transmission path back to the outgoing loop dial terminal during each incoming dial pulse train. When the called party answers, the battery feeding tip and ring of the incoming loop dial terminal is reversed. This reversed polarity places varistor V1 in the high resistance or open condition, and places varistor V2 in the forward or low resistance direction. Thus reversing the battery switches resistor 118 out of the circuit and conductively connects the winding of relay A2 across the tip and ring. This winding offers a high impedance to voice frequency currents so that the called party's telephone set and connecting cable terminates the terminal drop. Battery current through the winding of the A2 relay effects the operation of this relay, thereby to terminate the transmission of the 4,000 cycle tone back to the outgoing loop dial terminal. This allows capacitor 111, which had previously been held positive by the signal tone, to charge up to a negative potential and thus turn on transistor T1, releasing relay D1. When relay D1 releases, the battery potential fed to the tip and ring of the outgoing loop dial terminal is reversed, this reversal constituting an answering supervisory signal. In order that the sleeve may be grounded in event of carrier failure, loss of 4,000 cycle tone releases the normally operated D1 relay, thereby placing a ground on the sleeve lead through the back contact of the normally released B1 relay. When the connection is released the outgoing and incoming terminal units are restored to normal idle condition.

Figure 12:
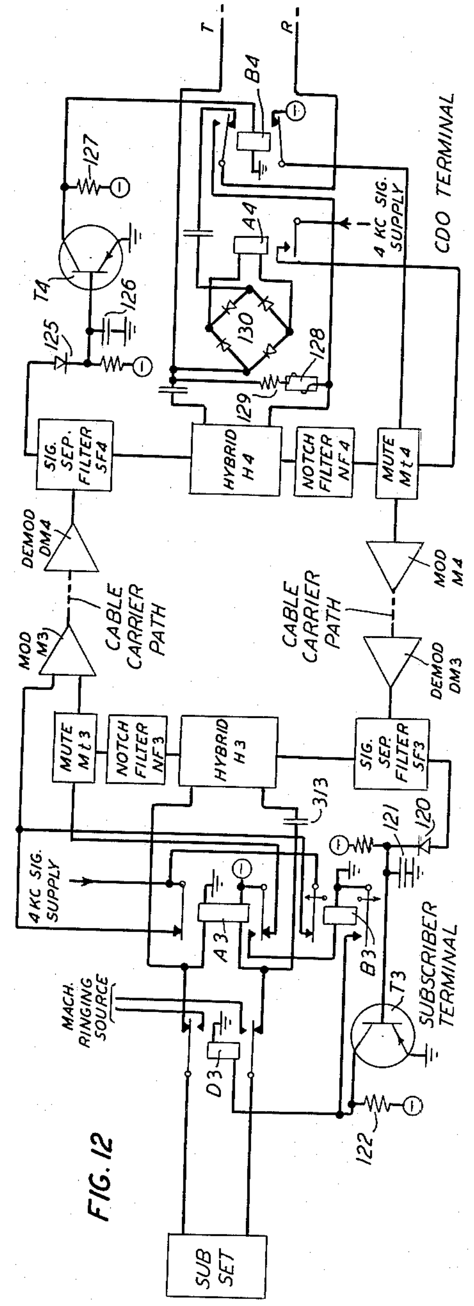

A foreign exchange trunk, used to provide subscriber service over inter-exchange cable from a community dial office, is shown in FIG. 12. This trunk, which is operated on a carrier basis, is represented by the signaling elements at the subscriber's and central office ends of the trunk. It is shown in normal idle condition. When the subscriber is called, ringing voltage is applied at the central office to the CDO terminal of the carrier trunk, whereby a calling signal is transmitted to the subscriber terminal end of the trunk to cause the release of relay D3 and connection of a source of ringing voltage to the subscriber's line. When the subscriber's set closes the loop to the subscriber carrier terminal to originate a call, a signal is transmitted to the CDO terminal which causes the loop presented to the central office to be closed. When the subscriber pulses his loop, the loop at the CDO terminal is pulsed. When the CDO terminal is in the "on hook" or idle condition, ringing voltage applied to the tip and ring connections of the CDO terminal passes through back contacts of relay B4 and is changed to direct current in the varistor bridge 130. This direct current energizes the winding of relay A4. The operation of relay A4 connects 4,000 cycle signaling tone to the modulator of the CDO terminal for transmission to the demodulator of the subscriber terminal. When the 4,000 cycle tone is demodulated in the demodulator of the subscriber terminal, this tone is rectified by varistor 120 so that a positive voltage causes transistor T3 to change to open or a non-conduction state allowing all the current which is passing through resistor 122 to pass through the winding of relay D3 instead of through the transistor. Relay D3 operates to connect a source of ringing voltage to the tip and ring of the subscriber terminal. When the subscriber completes the loop between the tip and ring on the subscriber terminal, current through the winding of relay A3 operates this relay. The operation of relay A3 applies 48-volt battery to the winding of relay B3; removes 48-volt battery from the mute circuit M*t*3 to allow voice frequency currents from the hybrid unit H3 to pass through the mute circuit to the modulator M3; and removes 4,000 cycle signaling tone from the modulator. The operation of relay B3 prevents the operation of relay D3 when the subscriber set is "off hook," by short circuiting the winding of this relay. When the 4,000 cycle signal tone is absent from the output of demodulator DM4, the positive potential, that has been maintained across capacitor 126 by the rectified tone, is changed to a negative voltage by current through resistor 124. This turns on transistor T4, changing it to a low resistance path between the collector and emitter, so that the current through resistor 127 flows through the transistor instead of through the winding of relay B4. This allows relay B4 to release so that the loop between tip and ring is completed through the relay contacts, retard coil 123 and reistor 129. With relay B4 released, the varistor network 130 and winding of relay A4 are disconnected from the tip and ring talking conductors; and 48-volt battery is disconnected from the mute circuit so that voice frequency current from these conductors may pass from the hybrid unit H4 to the modulator M4. This completes the two-way talking path. During transmission of a dial pulse train, however, the mute circuits are operated because they are of a slow-release type. Thus the voice path is blocked during dialing to prevent extraneous voice frequency currents from interfering with the signal path. When the subscriber dials, relay A3 follows the pulses, thus applying corresponding pulses of 4,000 cycle signal tone to the modulator M3. This pulsed tone is recovered from the demodulator DM4 to cause relay B4 to repeat the pulses over the loop between tip and ring of the CDO terminal. The 4,000 cycle tone is also connected to the modulator by contacts of the slow-release relay B3. The operation of the B3 relay is slow enough so that if, at the end of a ringing cycle, the line is left charged with a potential, the short operation of the A3 relay which occurs when the line discharges will not disconnect the 4,000 cycle tone from the modulator M3.

What is claimed is:

1. A multi-exchange telephone system comprising a cable between two exchanges for use in establishing conversational connections between subscribers in one and subscribers in the other of said two exchanges, a plurality of carrier channel units in one of said exchanges, each channel unit including a carrier transmitter and a carrier receiver adapted for operation at the same one of a like plurality of different carrier frequencies, a like plurality of like carrier channel units in the other of said two exchanges, the carrier transmitters of said units in said one exchange being operatively connected through one pair of conductors in said cable to the carrier receiver of said units in said other exchange and the carrier transmitters of said units in said other exchange being operatively connected through another pair of conductors in said cable to the carrier receivers of said units in said one exchange, means supplying carrier current of each different carrier frequency to the transmitter of the corresponding channel units in said two exchanges, inter-exchange trunk circuit units, one for each carrier channel unit in each said exchange, each trunk circuit unit connected to transmit voice currents to the carrier transmitter of the associated channel unit to effect modulation of the outgoing carrier current and connected to receive voice currents from the carrier receiver of the associated channel unit, each said carrier transmitter comprising means which effects pulse position modulation and conversion to sine wave phase modulation of the carrier current supplied thereto, each said carrier receiver comprising means for effecting demodulation of incoming sine wave phase modulated carrier currents, means for applying signal current of a particular voice frequency to each said carrier transmitter to further modulate the outgoing carrier current.

2. A multi-exchange telephone system comprising a cable between two exchanges for use in establishing conversational connections between subscribers in one and subscribers in the other of said two exchanges, a plurality of carrier channel units in one of said exchanges, each channel unit including a carrier transmitter and a carrier receiver adapted for operation at the same one of a like plurality of different carrier frequencies, a like plurality of like carrier channel units in the other of said two exchanges, the carrier transmitters of said units in said one exchange being operatively connected through one pair of conductors in said cable to the carrier receiver of said units in said other exchange and the carrier transmitters of said units in said other exchange being operatively connected through another pair of conductors in said cable to the carrier receivers of said units in said one exchange, means supplying carrier current of each different carrier frequency to the transmitter of the corresponding channel units in said two exchanges, inter-exchange trunk circuit units, one for each carrier channel unit in each said exchange, each trunk circuit unit connected to transmit voice currents to the carrier transmitter of the associated channel unit to effect modulation of the outgoing carrier current and connected to receive voice currents from the carrier receiver of the associated channel unit, each said carrier transmitter comprising means which effects pulse position modulation and conversion to sine wave phase modulation of the carrier current supplied thereto, each said carrier receiver comprising means for effecting demodulation of incoming sine wave phase modulated carrier currents, means for applying signal current of a particular voice frequency to each said carrier transmitter to further modulate the outgoing carrier current and means in each carrier receiver for responding to signal current of said particular voice frequency resulting from demodulation of the incoming carrier current, signal modulated carrier current being transmitted in both directions while the associated trunk circuits are in idle condition.

3. In a carrier telephone system comprising a plurality of carrier channels for transmitting and receiving voice currents and signal current of a particular voice frequency, a carrier channel transmitter comprising a transistor amplifier for amplifying the voice current input to a level suitable for modulation of carrier current and adapted to limit the peak amplitude of the voice current input to prevent over modulation of the carrier current, means including a transistor responsive to the application of carrier frequency voltage for generating sawtooth carrier frequency pulses, means comprising another transistor biased to pass square pulses of carrier frequency responsive to application of said sawtooth pulses, means for applying voice currents to said other transistor to modulate the width of said square wave pulses, means for applying signal tone of a particular voice frequency to further modulate said square wave carrier frequency pulses, a differentiating network for converting said square waves of carrier current into positive and negative spikes, said spikes of one polarity being generated by the leading edges of said square pulses, and means comprising a transistor amplifier non-responsive to said spikes of the opposite polarity and responsive to said spikes of the one polarity to transmit phase modulated sine wave carrier current.

4. In a carrier transmitter according to claim 3, means for applying a cut-off voltage to the emitter of the voice frequency amplifying transistor, thereby to limit voice current modulation of the carrier current.

5. A multi-exchange telephone system comprising a cable between two exchanges for use in establishing conversational connections between subscribers in one and subscribers in the other of said two exchanges, a plurality of carrier channel units in one of said exchanges, each channel unit including a carrier transmitter and a carrier receiver adapted for operation at the same one of a like plurality of different carrier frequencies, a like plurality of like carrier channel units in the other of said two exchanges, the carrier transmitters of said units in said one exchange being operatively connected through one pair of conductors in said cable to the carrier receiver of said units in said other exchange and the carrier transmitters of said units in said other exchange being operatively connected through another pair of conductors in said cable to the carrier receivers of said units in said one exchange, means supplying carrier current of each different carrier frequency to the transmitter of the corresponding channel units in said two exchanges, inter-exchange trunk circuit units, one for each carrier channel unit in each said exchange, each trunk circuit unit connected to transmit voice currents to the carrier transmitter of the associated channel unit to effect modulation of the outgoing carrier current and connected to receive voice currents from the carrier receiver of the associated channel unit, each said carrier transmitter comprising means which effects pulse position modulation and conversion to sine wave phase modulation of the carrier current supplied thereto, each said carrier receiver comprising means for effecting demodulation of incoming sine wave phase modulated carrier currents, one or more amplifying repeaters conductively inserted in each said cable pair to compensate for attenuation of the carrier currents therein, each said repeater comprising two transistors connected push-pull, one in each conductor of the cable pair in which the repeater is inserted, and means comprising a current regulated voltage supply in each exchange connected in simplex to the conductors of the one or the other of said cable pairs for operatively energizing each repeater in each said pair, each said repeater being arranged to extend the voltage supply path to the next section of cable, each said simplex voltage supply path terminated by ground potential in the remote one of the exchanges.

6. In a carrier telephone system, a current regulated power supply unit comprising a battery voltage supply and a voice frequency alternating current supply, an input current regulator, a switching circuit, a voltage doubler and a ripple filter; said regulator comprising a first transistor energized by said battery voltage and diode means for holding the current through the transistor constant; said switching means comprising a second and a third transistor and a disconect diode connected therebetween, means applying said voice frequency voltage to said second transistor to alternately turn said second transistor on and off at the voice frequency rate; said voltage doubler comprising rectifier diodes, a capacitor coupling said rectifier diodes to and through said disconnect diode to the collector of said second transistor, a capacitor connected for charge to said battery voltage, a capacitor connected to said rectifier diodes for charge to the rectified voice frequency voltage, and means connecting said battery charged and rectified voltage charged capacitors in series with said ripple filter to constitute a power supply, the voltage of which is equal to the sum of the battery and rectified voltages.

7. A carrier telephone system according to claim 6, each said carrier receiver comprising an input channel band-pass filter, a carrier frequency transistor amplifier, a limiter comprising a first transistor which further amplifies the carrier input to a level which assures limiting action to obtain a constant output level, said first transistor being conductive responsive to only the negative tips of the carrier frequency, an emitter by-pass capacitor which is too small to pass voice frequencies, whereby the carrier output pulses from said first transistor tend to be constant area, means for integrating the constant area pulse output from said first transistor to obtain constant amplitude output, said carrier receiver further comprising a demodulator transistor and an input network having oppositely poled diodes for applying out-of-phase components of the constant amplitude output to the base of said demodulator transistor, thereby to vary the conduction time of said demodulator, means biasing said demodulator transistor to start conduction by the zero voltage axis crossing of one component of the network output voltage going negative and terminating conduction by the zero voltage axis crossing of the other component of the network output voltage going positive, only the region of plus or minus 0.1 volt from the zero voltage axis having any influence on the conduction of said demodulator transistor, said conduction time varying with frequency and not with amplitude variation whereby the demodulator transistor changes frequency variation in the input to pulse width variation in the output, and means in the demodulator transistor collector circuit for integrating the pulse width variation to produce voice frequency currents.

8. A carrier telephone system according to claim 7, said carrier receiver further comprising a transistor for amplifying the voice frequency output of said integrating means, and a signal separating filter for blocking transmisison of current of signaling frequency to the voice path of the associated trunk circuit, signal receiving means in the associated trunk circuit, and signal frequency amplifying means for transmitting signal frequency current to said signal receiving means.

9. In a telephone carrier system, a receiver for receiving a phase modulated sine wave carrier, demodulating means coupled to the output of the receiver comprising a frequency sensitive phase shifting network in which the amount of phase shift varies with variations in the frequency of the input waves from the mean frequency of the carrier, means for applying the phase modulated carrier to the input of the network to derive in its output waves shifted in phase in dependence on the instantaneous frequency of the carrier, means coupled to the input and output of the network and responsive to the input and output waves therefrom for producing pulses varying in width in dependence on the phase difference between the input and output waves, and means for deriving from the variable width pulses the modulating frequencies of the carrier.

10. In a telephone carrier system according to claim 9 in which the means coupled to the input and output of the network comprises a pair of series connected oppositely poled diodes and a switch rendered operative by the input and output waves during the period when they are simultaneously of a predetermined polarity for producing the variable width pulses, said switch being connected to the junction point of the diodes.

11. In a telephone carrier system according to claim 10 including a limiter coupled between the receiver and network for limiting the amplitude of one polarity of the phase modulated carrier, the diodes being so poled as to pass only the waves of the one polarity.

12. In a telephone carrier system as defined by claim 9, a limiting amplifier between the receiver output and demodulating means for producing a constant level output of the phase modulated sine wave carrier.

13. In a telephone carrier system as defined in claim 10 in which the frequency sensitive network comprises a pair of similar reactive circuits, a capacitance coupling the circuits, said diodes being connected across the capacitance, the switch comprising a transistor having its base connected to the junction between the diodes.

References Cited in the file of this patent

UNITED STATES PATENTS

| | | |
|---|---|---|
| 2,086,918 | Luck | July 13, 1937 |
| 2,113,214 | Luck | Apr. 5, 1938 |
| 2,411,130 | Evans | Dec. 12, 1946 |
| 2,425,924 | Crosby | Aug. 19, 1947 |
| 2,514,148 | Von Baeyer | July 4, 1950 |
| 2,816,962 | Stanley | Dec. 17, 1957 |
| 2,927,966 | Weller | Mar. 8, 1960 |

FOREIGN PATENTS

| | | |
|---|---|---|
| 482,665 | Canada | Apr. 22, 1952 |

UNITED STATES PATENT OFFICE

CERTIFICATE OF CORRECTION

Patent No. 3,116,371 December 31, 1963

Lester Q. Krasin

It is hereby certified that error appears in the above numbered patent requiring correction and that the said Letters Patent should read as corrected below.

Column 3, line 71, for "attentuation" read -- attenuation --; column 4, line 18, for "frequency," read -- frequency; --; column 5, line 8, for "plies all of these output currents through a coupling" read -- rents from the A group channels with the frequency --; line 10, for "tran-" read -- trans- --; column 14, line 2, for "reistor" read -- resistor --; column 16, line 29, for "disconect" read -- disconnect --.

Signed and sealed this 19th day of May 1964.

(SEAL)
Attest:

ERNEST W. SWIDER

Attesting Officer

EDWARD J. BRENNER
Commissioner of Patents